May 9, 1961  O. C. SCHULTZ  2,983,350
SPEED RESPONSIVE ROTARY DRIVE
Filed Jan. 8, 1959  2 Sheets-Sheet 1
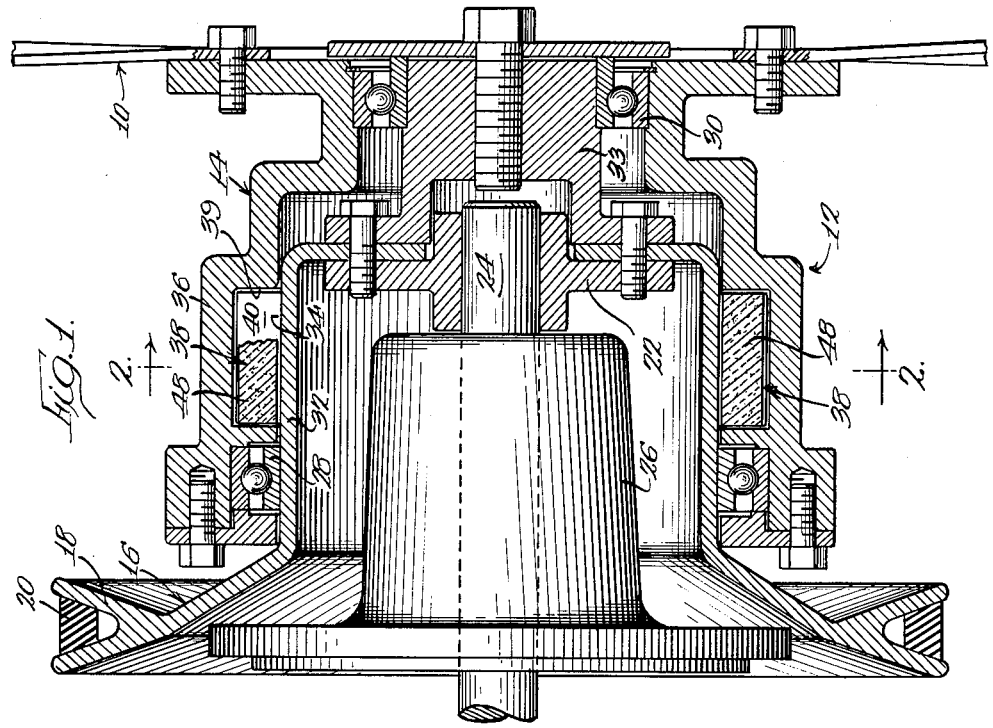
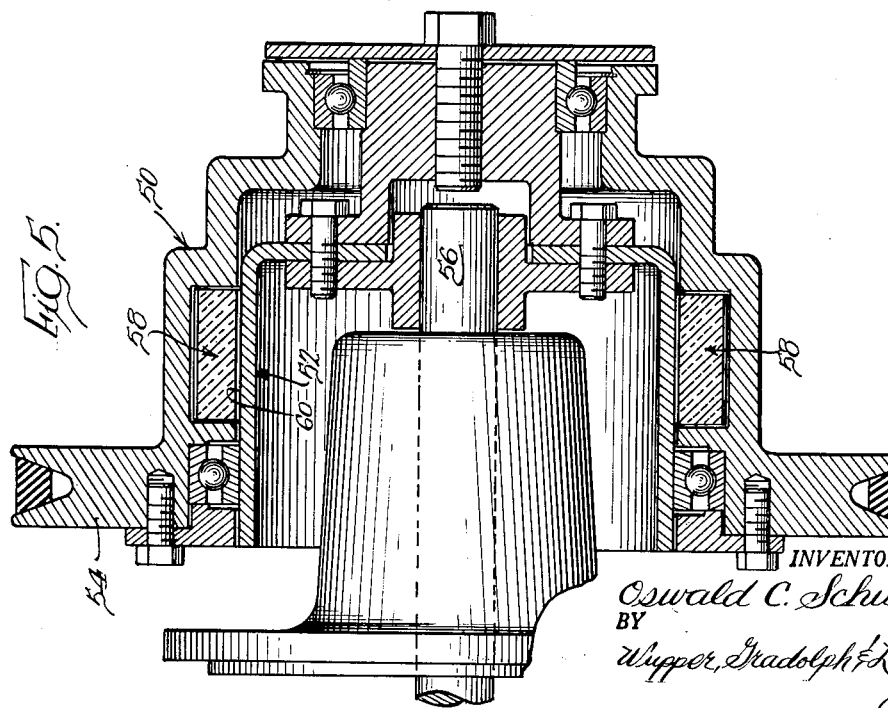
INVENTOR.
Oswald C. Schultz
BY
Wupper, Gradolph & Love
Att'ys

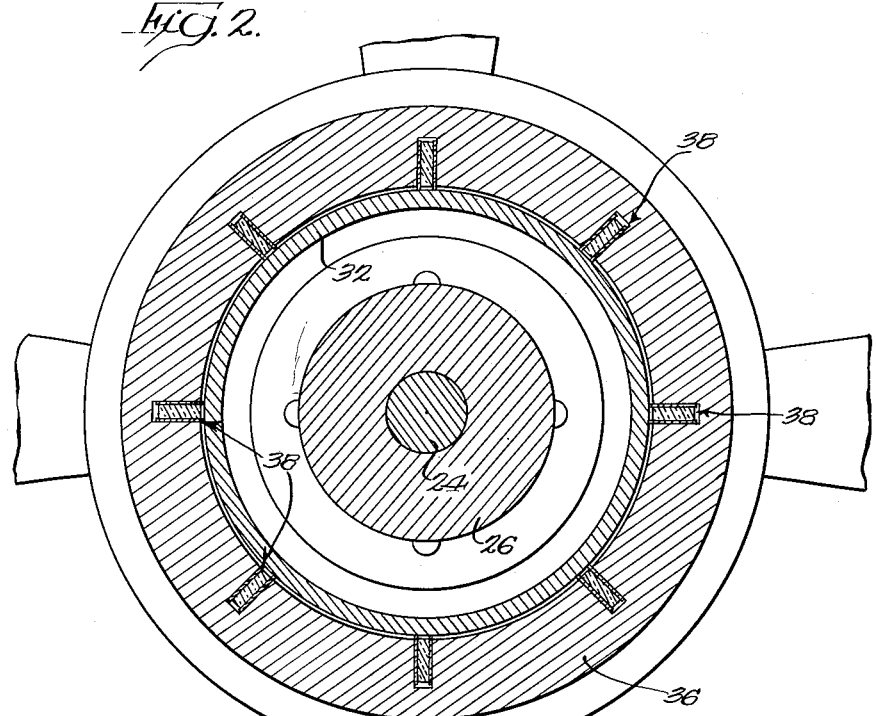
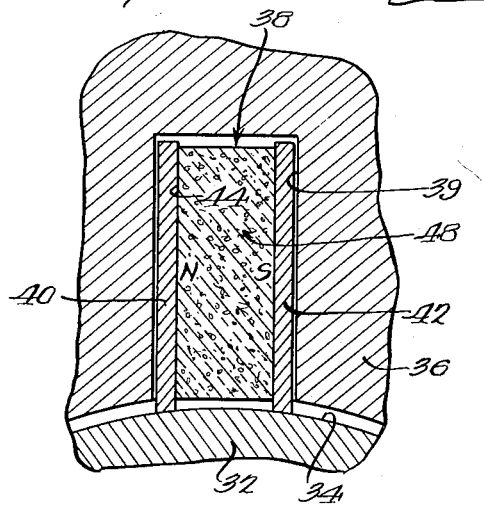
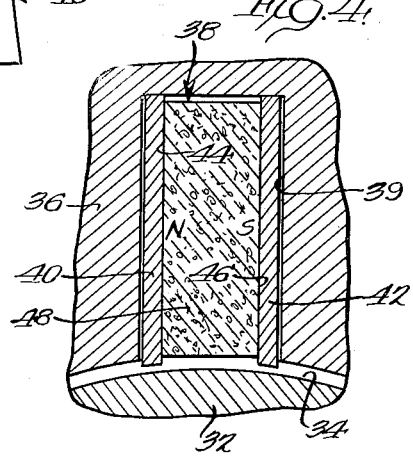
INVENTOR.
Oswald C. Schultz

United States Patent Office 2,983,350
Patented May 9, 1961

2,983,350

SPEED RESPONSIVE ROTARY DRIVE

Oswald C. Schultz, St. Joseph, Mich., assignor to Laboratory Equipment Corporation, St. Joseph, Mich., a corporation of Michigan Filed Jan. 8, 1959, Ser. No. 785,643

7 Claims. (Cl. 192—84)

The present invention relates to speed responsive rotary drives.

One object of the invention is to provide a new and improved rotary drive which responds automatically to its own rotary speed to control the driving of a rotary member by magnetically induced friction in the drive.

Another object is to provide a new and improved rotary drive which drives a rotary member by friction magnetically induced by magnetic means on which the centrifugal force incident to rotation of the drive operates to provide a speed responsive control of the drive to the driven member.

Another object is to provide an improved rotary drive, as recited, which is well adapted either to limit the output speed of the driven member or to release the driven member when the driving member is rotated faster than a predetermined speed.

A further object is to provide a rotary drive of simple, economical construction, in which permanent magnet units normally drive a driven member by magnetically induced friction and respond directly to centrifugal forces incident to rotation of the units faster than a predetermined speed to release the drive to the driven member.

An additional object is to provide a new and improved rotary drive of the above character which is inherently capable of a high operating efficiency and undiminished reliability over a long service life despite any wear that may occur on coacting friction elements in the drive.

Other objects and advantages will become apparent from the following description of the exemplary embodiments of the invention illustrated in the drawings, in which:

Fig. 1 is a longitudinal sectional view of one embodiment of the invention adapted to drive an automobile engine fan at speeds up to a predetermined speed value less than the maximum speed of the engine driven driving member of the drive;

Fig. 2 is a transverse sectional view taken along the line 2—2 of Fig. 1;

Fig. 3 is a fragmentary transverse sectional view of an enlarged scale showing one of the speed responsive magnet units in the drive engaging the driving member;

Fig. 4 is a view similar to Fig. 3 but showing the magnetic unit disengaged from the driving member; and Fig. 5 is a longitudinal sectional view of another embodiment of the invention adapted to drive a driven element only when the speed of a driving element is lower than a predetermined speed value.

It will be understood that the present invention is not necessarily limited to the particular embodiments illustrated, but includes all other forms within the spirit and scope of the invention as expressed in the appended claims.

As adapted to drive an automobile engine fan 10 up to but not over the maximum fan speed required to ensure effective engine cooling, the rotary drive 12, forming the first embodiment of the invention illustrated in Fig. 1, comprises a rotary driven member or element 14 connected to support and drive the fan 10 and an engine driven rotary driving member or element 16 concentric with the driven member 14.

One end of the driving member 16 (the left end in Fig. 1) is shaped to form a pulley wheel 18 which receives an engine driven belt 20. The other end of the driving member 16 is connected through a hub 22 to a water pump shaft 24 protruding from a water pump housing 26. The driven member 14 is supported for rotation in coaxial relation to the driving member 16 by two antifriction bearings 28, 30 in opposite ends of the driven member, which are supported respectively on an intermediate cylindrical portion 32 of the driving member and a cylindrical extension 33 secured to the driving member and extending to the right, Fig. 1, beyond the shaft 24.

The intermediate cylindrical portion 32 of the driving member 16 defines an annular friction surface 34 facing away from the rotary axis of the driving member. This annular surface 34 is defined and underlaid by magnetic material, formed in this instance by a fabrication of the driving member 16, including its intermediate portion 32, from mild steel.

The annular surface 34, itself, is encircled by an intermediate annular portion 36 of the driven member 14, which is formed of a nonmagnetic material, aluminum for example. As shown, the driven member 14 is formed entirely of a nonmagnetic material.

The driven member 14 is rotated by the driving member 16 through friction induced magnetically by a circumferentially spaced series of speed responsive, permanent magnet units 38, Figs. 1 to 3, supported by the driven element for movement radially into and out of engagement with the surface 34. As shown, each magnetic unit 38 is slidably supported in a holder 39 formed in the nonmagnetic, intermediate annular portion 36 of the driven member 14 by a slot (also denoted by the numeral 39) parallel to the axis of the annular surface 34 and opening radially inward toward the surface as shown.

Each magnetic unit 38 comprises two pole pieces 40, 42 formed of flat, rectangular plates of magnetic material, such, for example, as mild steel. The two pole pieces are placed flat against the opposite sides or faces 44, 46 of a flat, rectangular permanent magnet 48 sandwiched between the pole pieces as shown in Fig. 3.

Each magnet 48 is relatively thin in relation to its width and length and is made of a magnetic material well adapted to form, when properly magnetized, a powerful permanent magnet having poles of opposite polarity on its respective faces 44, 46.

While the invention is not necessarily limited to the construction of the magnets 48 from any particular material, a most satisfactory material commercially available for this purpose is ceramic in character having essential components of barium carbonate and iron oxide. Such permanent magnetic material is known by Phillips of Holland as "Ferrox-Dur" and is known commercially under the name "Indox."

As shown in Figs. 3 and 4, each magnetic unit 38 fits slidably in its holder 39 with one longitudinal edge of each pole plate 40, 42 opposing the friction surface 34. The width of the individual pole plates 40, 42 and of the intervening magnet 48, as measured radially away from the axis of the surface 34, is somewhat less than the spacing of the bottom of the corresponding holder slot 39 from the surface 34. This provides mechanical freedom for the magnetic unit 38 to move radially outward, separating the pole pieces 40, 42 somewhat from the friction surface 34, Fig. 4.

Since the holders 39 are formed of nonmagnetic material, the magnetic circuit of the lowest magnetic reluctance between each pair of pole pieces 40, 42 extends through the opposing magnetic portion 32 of the driving member 16.

Hence, both pole pieces 40, 42 of each magnetic unit 48 are normally attracted magnetically into firm engagement with the friction surface 34. The resulting frictional resistance to movement of the pole pieces along the friction surface 34 is effective to transmit driving torque from the driving member 16 to the driven member 14 to rotate the latter and the connected fan 10.

Through design, the torque transmitting capacity of the coupling 12 can be adapted to the load requirements by varying the diameter of the friction surface 34 and by varying the number and strength of the magnetic units 38.

In any event, the torque transmitting friction is produced in the coupling by magnetic attraction of the magnetic units 38 inward toward the axis of the friction surface 34. Rotation of the coupling 10, and the magnetic unit holders 40 in particular, produces centrifugal forces acting directly on the individual magnetic units 38 urging them outwardly away from the driving surface 34. When the driven member 14 reaches a predetermined rotary speed, the centrifugal forces on the magnetic units 38 separate them from the surface 34 (Fig. 4) to release the drive to the driven member and limit its speed even though the rotary speed of driving member 16 may continue to increase.

The extent to which the pole pieces 40, 42 separate from the surface 34 is limited to a very small degree of movement by engagement of the pole pieces with the bottom of the supporting holder 39. As the driven member 14 slows down somewhat, the pole pieces 40, 42 of the several magnetic units 38 are magnetically attracted back into engagement with surface 34 to reestablish the rotary drive to the driven member.

Thus, the drive 12 rotates the driven member 14 and responds automatically to the rotary speed of the drive to limit the speed of the driven member 14 to a predetermined design speed independently of higher speeds attained by the driving member 16. In the first embodiment of the invention just described, the rotation of the driven member 14 and fan 10 is limited to the speed required to ensure adequate engine cooling, thus eliminating the wastage of power incurred in driving the fan 10 at unnecessarily high speeds which would otherwise attend the higher speeds of the engine driven driving member 16.

Fig. 5 illustrates another embodiment of the invention which is adapted to respond automatically to the rotary speed of the driving member to discontinue driving of the driven member when the speed of the driving member exceeds a predetermined value. Here the speed responsive release of the driven member is controlled by only the speed of the driving member. Having reference to the illustrative structure shown in Fig. 5, the driving member 50 and driven member 52 are generally similar in construction to the driven member 14 and the driving member 16, respectively, of the previously described embodiment of the invention. The driving member 50 is equipped with a driving pulley 54 and the driven member 52 is connected to an output shaft 56, which can be used to drive any appropriate machine, not necessarily a water pump. Magnetic units 58 mounted in the driving element 50 are similar in construction and operation to the magnet units 38 shown in Figs. 1 to 4.

Thus formed, the coupling of Fig. 5 drives the driven member 52 and shaft 56 until the driving element 50 exceeds a predetermined speed at which centrifugal force separates the magnetic units 58 from a friction surface 60 on the driven member 52, thus releasing the drive to the driven member until the speed of the driving member has reduced sufficiently for reengagement of the magnetic units 58 with the friction surface 60.

The extremely simple structure of the speed responsive coupling thus provided is very dependable in operation and inherently economical to manufacture.

The ability of the pole pieces 40, 42 to move inwardly to compensate for wear assures continued efficiency in operation over a long service life.

What I claim as new and desire to secure by Letters Patent of the United States is:

1. A speed responsive rotary drive comprising, in combination, first and second drive elements rotatable in generally coaxial relation to each other, said first drive element defining an annular friction surface facing away from the axis of the first drive element, magnetic material underlying said surface, said second drive element including an annular portion of nonmagnetic material encircling said annular surface, said nonmagnetic annular portion defining therein a circumferentially spaced series of slots extending radially outward from said surface, each of said slots slidably containing a freely floating magnetic unit including a thin generally flat permanent magnet defining on opposite sides thereof pole faces of opposite polarity and including two pole plates of magnetic material engaging opposite sides of the intervening magnet and having edges normally initially engaging said surface to form a driving connection between said first and second drive elements, and said slots being dimensioned to allow limited sliding movement of said pole plates radially outwardly from said annular surface under the influence of centrifugal force incident to rotation of said second drive element and thereby to sever said driving connection between said first and second drive elements.

2. A speed responsive rotary drive comprising, in combination, first and second drive elements rotatable in generally coaxial relation to each other, said first drive element defining an annular surface thereon facing away from the rotary axis of the element, magnetic means underlying said surface, a freely floating magnetic unit engageable with said surface, means on said second drive element coacting with said magnetic unit to rotate the latter with said second drive element and supporting said unit for movement toward and away from the axis of said surface to mutually engage and disengage said unit and said surface, and said magnetic means and said magnetic unit including means mutually coacting magnetically to magnetically attract said unit into engagement with said surface.

3. A speed responsive rotary drive comprising, in combination, a rotary drive element including a annular portion formed of magnetic material and defining an annular surface encircling and facing away from the axis of the element, a second drive element rotatable in generally coaxial relation to said surface and including an annular portion of nonmagnetic material encircling said surface, said nonmagnetic annular portion of said second drive element defining therein a circumferentially spaced series of holders opening toward said surface, a magnetic unit mounted in each of said holders for a free floating movement therein and including two spaced pole pieces of magnetic material and an intervening permanent magnet having opposite holes engaging the respective pole pieces, each of said holders including means supporting the pole pieces of the coacting magnetic unit for radial movement inwardly into engagement with said surface and limited radial movement outwardly from said surface by centrifugal force incident to rotation of said second drive element.

4. A speed responsive rotary drive comprising, in combination, a first rotary drive element defining an annular surface encircling and facing away from the axis of the drive element and underlaid by magnetic material, a second drive element rotatable in generally coaxial relation to said surface, a magnetic unit engageable with said surface and including magnetic means coacting with said magnetic material to hold said unit against said surface, guide means rotatable with said second drive element and coacting with said magnetic unit to rotate the latter with said second drive element, and said guide means including means for guiding movement of said magnetic unit radially away from said surface by centrifugal force on the unit incident to rotation of said second drive element.

5. A speed responsive drive comprising, in combination, a rotary driving member defining an annular surface thereon encircling and facing away from the axis of the driving member, magnetic material underlying said surface, a driven member rotatable in generally coaxial relation to said annular surface, a freely floating magnetic unit including a permanent magnet therein for attracting the unit radially inward into engagement with said surface to be driven rotatably by the latter, and said driven member including a holder coacting with said magnetic unit to transmit rotary movement of the latter to said driven member and provide for movement of the magnetic unit inwardly into engagement with said surface and outwardly from said surface under the influence of centrifugal force incident to rotation of said driven member.

6. A speed responsive rotary drive comprising, in combination, a rotary driven member defining an annular surface encircling and facing away from the driven member, magnetic material underlying said surface, a rotary driving member mounted for rotation in generally coaxial relation to said surface, a freely floating magnetic unit including a permanent magnet for coacting with said magnetic material to magnetically hold the unit in engagement with said surface, and said driving member including a nonmagnetic holder coacting with said magnetic unit to rotate the latter with said driving member and provide for movement of said unit inwardly into engagement with said surface and outwardly away from said surface under the influence of centrifugal force incident to rotation of said driving member above a predetermined speed.

7. A speed responsive rotary drive comprising, in combination, a first rotary drive element defining an annular surface encircling and facing away from the axis of the drive element, magnetic material underlying the surface, a second drive element rotatable in generally coaxial relation to said surface and including a nonmagnetic holder, a magnetic unit slidably mounted in said holder for free movement inwardly into engagement with said surface and outwardly from said surface under the influence of centrifugal force incident to rotation of said second drive element, and said magnetic unit including a pair of pole pieces opposing said surface and a permanent magnet sandwiched between the pole pieces to magnetize the latter as magnetic poles of opposite polarity.

References Cited in the file of this patent
UNITED STATES PATENTS 2,863,320  Mendenhall _____ Dec. 9, 1958

FOREIGN PATENTS 765,586  Great Britain _____ Jan. 9, 1957